United States Patent [19]

Sturm

[11] Patent Number: 5,224,906
[45] Date of Patent: Jul. 6, 1993

[54] HYDRAULIC ACTUATOR FOR CLUTCH ASSEMBLIES

[75] Inventor: Gary L. Sturm, Fort Wayne, Ind.
[73] Assignee: Dana Corporation, Toledo, Ohio
[21] Appl. No.: 927,582
[22] Filed: Aug. 10, 1992
[51] Int. Cl.⁵ .............................................. F16H 1/445
[52] U.S. Cl. .................... 475/86; 192/85 CA
[58] Field of Search ................ 475/86, 84; 192/85 R, 192/85 CA

[56] References Cited

U.S. PATENT DOCUMENTS

| | | | |
|---|---|---|---|
| 3,546,969 | 12/1970 | Gibson et al. | 475/88 |
| 3,987,689 | 10/1976 | Engle | 475/88 |
| 4,719,998 | 1/1988 | Hiramatsu et al. | 192/0.033 |
| 4,727,966 | 3/1988 | Hiramatsu et al. | 192/0.033 |
| 4,781,078 | 11/1988 | Blessing et al. | 475/150 |
| 4,821,604 | 4/1989 | Asano | 74/718 |
| 4,838,374 | 6/1989 | Walton | 180/140 |
| 4,872,372 | 10/1989 | Bantle et al. | 475/150 |
| 4,905,808 | 3/1990 | Tomita et al. | 192/85 AA |
| 4,909,371 | 3/1990 | Okamoto et al. | 192/103 |
| 4,923,029 | 5/1990 | Lanzer | 475/86 X |
| 4,938,306 | 7/1990 | Sumiyoshi et al. | 180/233 |
| 4,966,249 | 10/1990 | Imaseki | 180/233 |
| 4,966,250 | 10/1990 | Imaseki | 180/233 |
| 4,967,884 | 11/1990 | Norcia | 192/85 CA |
| 4,976,347 | 12/1990 | Sakakibara et al. | 192/58 C |
| 5,113,657 | 5/1992 | Campton et al. | 192/85 CA |

*Primary Examiner*—Dirk Wright
*Attorney, Agent, or Firm*—Dykema Gossett

[57] ABSTRACT

A control system for actuating various types of clutches includes a first piston which contacts a clutch disc associated with a first shaft. The first piston forces the first shaft clutch disc into a corresponding clutch disc associated with a second shaft. A second piston is received within a fluid chamber, and is reciprocated by a motor to force fluid outwardly of the fluid chamber and against the first piston. In this way, the position of the second piston controls the force of the first piston against the clutch disc of the first shaft. An electronic control for the second piston motor accurately controls the position of the second piston to control the force of the first piston on the clutch discs. The first and second pistons, the ball screw motor, the fluid chambers and the fluid paths are all received in a casing for the shafts. In this way, the size of the clutch is reduced over prior art assemblies which typically required a separate pump removed from the casing.

20 Claims, 2 Drawing Sheets

HYDRAULIC ACTUATOR FOR CLUTCH ASSEMBLIES

BACKGROUND OF THE INVENTION

This invention relates to a fluid control for actuating clutch discs which is compact and quickly operable compared to prior art systems.

In the prior art, hydraulically actuated clutches are often incorporated in various vehicular drive transmissions. Typically, a separate pump positioned remote from the transmission case selectively supplies a pressurized fluid to an actuating member, which selectively actuates the clutch. The separate pump requires a complex structure, with separate fluid lines leading to the case. These lines and the separate pump occupy an undesirably large amount of space. These prior art systems have typically used rotary hydraulic pumps, and cannot be actuated as quickly as desirable.

In modern vehicles, the relative torque between driven shafts is often adjusted in response to computer controlled sensors which sense various drive variables. As an example, sensors may detect whether a vehicle is turning, the vehicle speed or other variables, and control the relative torque between two driven shafts in response to the sensed conditions. With the development of such systems, a need has arisen for a clutch assembly which can simply, quickly and accurately control the relative torque between two shafts. The prior art systems have not adequately addressed this need.

SUMMARY OF THE INVENTION

In a disclosed embodiment of the present invention, clutch discs are fixed to, and rotate with, each of a first and second shaft. A clutch control includes a first piston that contacts the clutch disc for the first shaft. A second piston reciprocates within a fluid chamber, and a fluid path connects the first and second pistons. By reciprocating the second piston within the fluid chamber, fluid within the chamber is forced through the fluid path towards or away from the first piston to control the force of the first piston against the clutch disc of the first shaft. By controlling this force, one can selectively control the relative torque between the first and second shafts.

The inventive clutch control may be completely enclosed in the transmission housing. Further, the control may be actuated quickly and accurately to control the relative torque.

In a preferred embodiment of the present invention, the second piston is driven by a ball screw motor which is electrically controlled in response to various conditions. The ball screw motor can be quickly and accurately actuated to control the force of the first piston against the first shaft clutch disc. The invention is explicitly disclosed in several types of transmissions utilizing clutches. It should be understood, however, that it has applications in any clutch.

These and other features of the present invention can be best understood from the following specification and drawings, of which the following is a brief description.

DETAILED DESCRIPTION OF A PREFERRED EMBODIMENT

Figure 1:
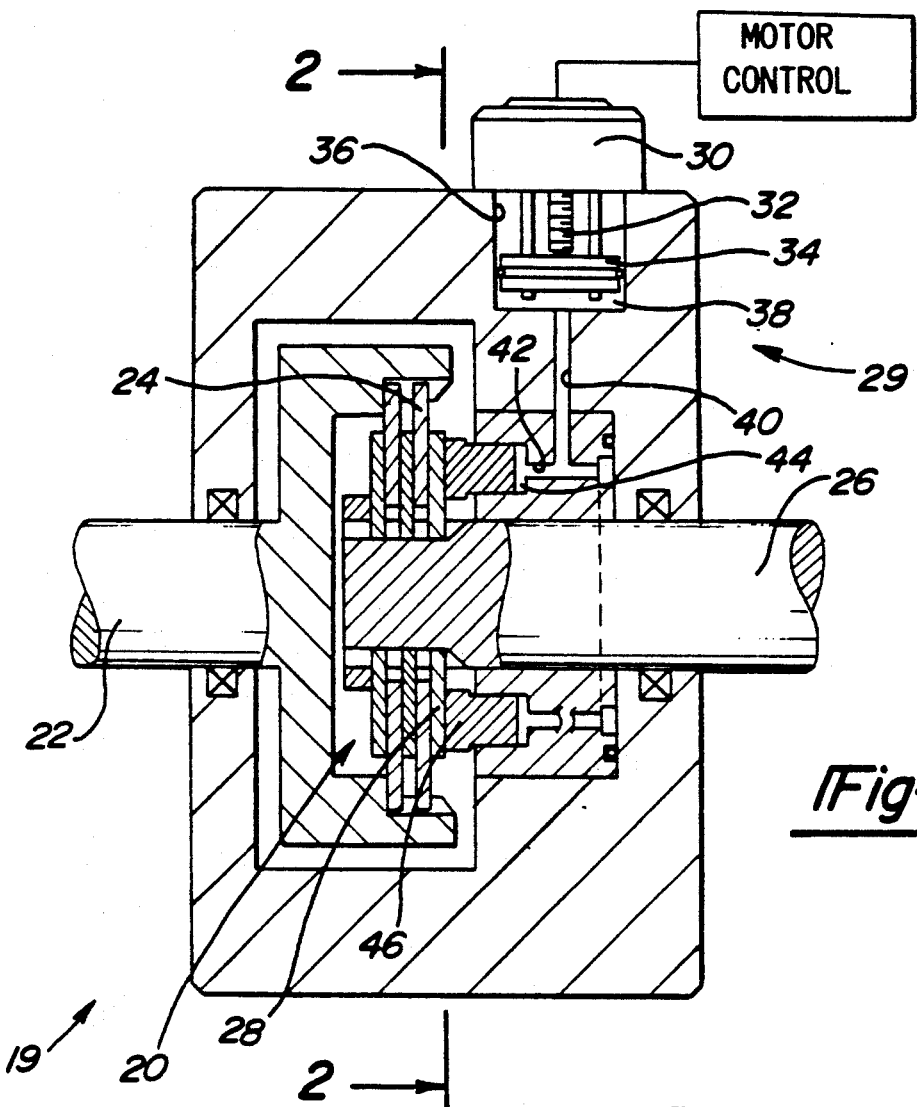
FIG. 1 is a cross-sectional view through a first embodiment clutch including the present invention.

A transmission 19 is illustrated in FIG. 1 having a clutch 20 for controlling the drive between a first shaft 22 having at least one clutch disc 24 and a second shaft 26 having at least one clutch disc 28. By forcing clutch disc 28 into contact with clutch disc 24, drive is selectively transmitted between shafts 22 and 26.

To control the transmission of drive between shafts 22 and 26, a clutch actuation control 29 is incorporated into the transmission casing 21. Control 29 includes a motor 30 driving a ball screw 32, which reciprocates a drive piston 34. Ball screw drives are known in the mechanical arts, and the exact features of the ball screw drive form no portion of this invention. Instead, the application of this type of ball screw drive as a control pump for a fluid actuated clutch provides important features to the present invention. Other types of rotating threaded drives may also be used.

By reciprocating drive piston 34 within a fluid chamber 36, a portion 38 of chamber 36 forwardly of piston 34 is expanded and contracted. As portion 38 expands and contracts, fluid is alternately forced into or out of a path or line 40 and a line 42. Line 42 communicates with a control chamber 44. Control chamber 44 communicates with a rearward face of a control piston 46, which selectively contacts clutch disc 28. Should it be desired to force clutch disc 28 into clutch disc 24, one reciprocates drive piston 34 to contract chamber 36. Fluid is forced through line 40, line 42 and into control chamber 44. This forces control piston 46 to the left as shown in FIG. 1, in turn forcing clutch disc 28 into clutch disc 24, and transmitting rotation between shafts 22 and 26.

The use of the electronically controlled motor 30 to drive ball screw 32 allows the position of drive piston 34 to be quickly and accurately controlled. In this way, one can quickly and accurately control the force on control piston 46, to control the relative torque between shafts 22 and 26. Further, the use of the electronically controlled motor allows the minimum cycling of this system to be on the order of several times a second. One known motor for such a ball screw type drive provides cycling times of 10–15 cycles per second. This provides effectively instantaneous torque adjustment.

Figure 2:
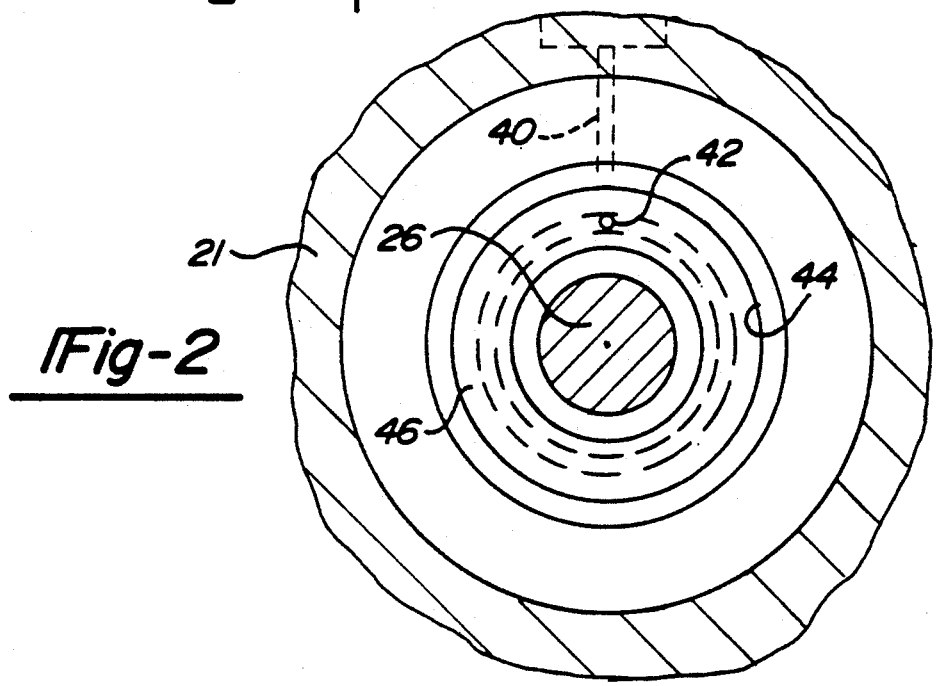
FIG. 2 is a cross-sectional view along line 2—2 as shown in FIG. 1.

As shown in FIG. 2, control piston 46 is annular and spaced circumferentially about shaft 26. Chamber 44 is annular and communicates with the rearward face of control piston 46. It is also envisioned that plural control pistons could be utilized.

Figure 3:
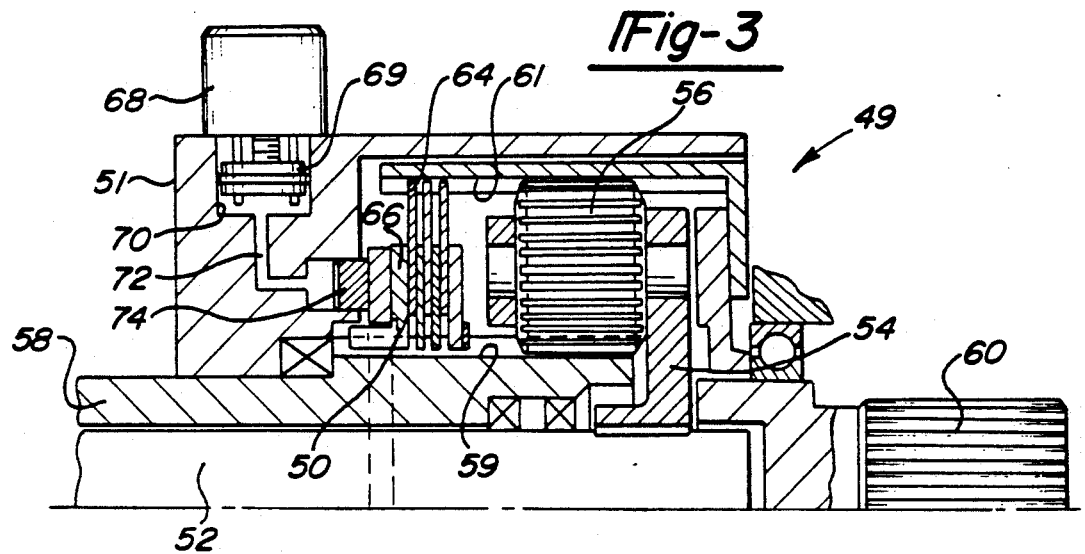
FIG. 3 is a partial cross-sectional view through a second embodiment clutch.
Figure 4:
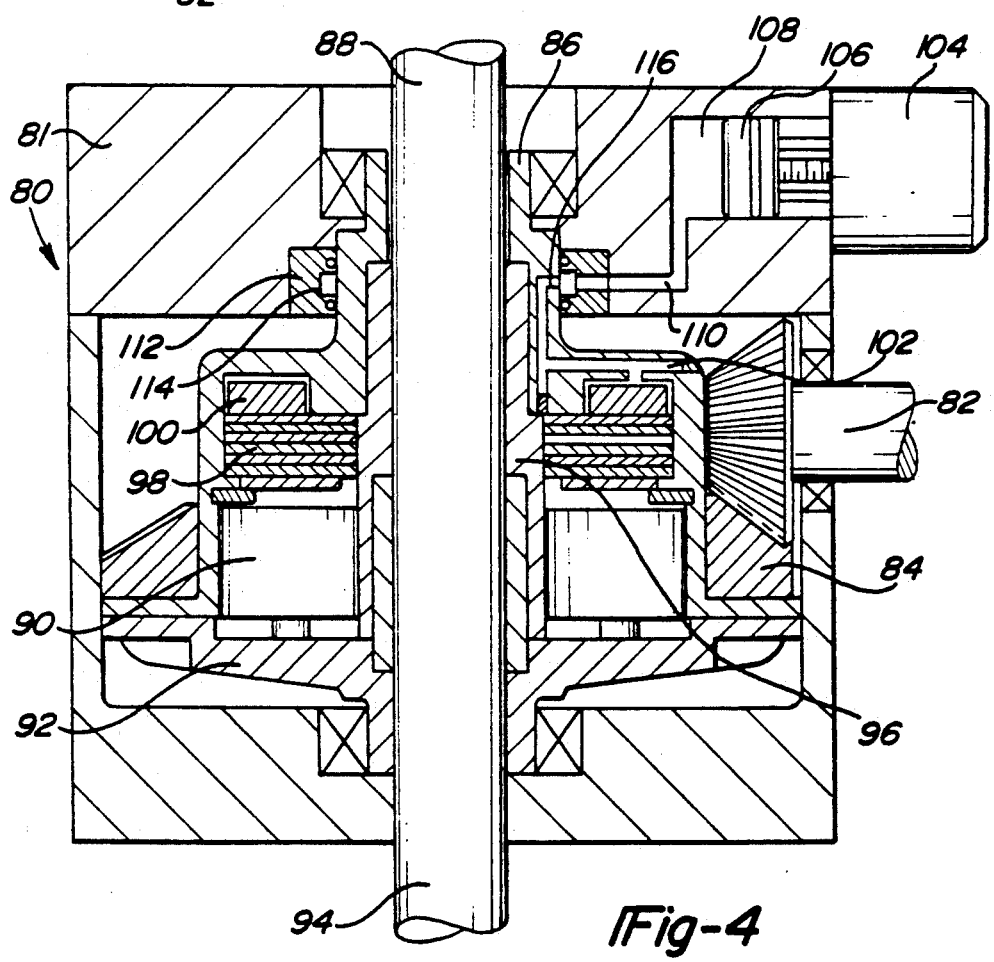
FIG. 4 is a cross-sectional view through a third embodiment clutch.

As shown in FIG. 3, a second transmission 49 has a clutch 50 incorporated into a casing 51 which encloses an input shaft 52. Input shaft 52 drives a planet gear carrier 54, which rotates planet gears 56. A first driven shaft 58 carries sun gear 59 which is driven by planet gears 56. A second driven shaft 60 carries ring gear 61 which is driven by planet gears 56. Thus, input shaft 52 drives shafts 58 and 60 through planet gears 56. At least one clutch disc 64 is associated with ring gear 61 and second shaft 60, while at least one clutch disc 66 is associated with sun gear 59, and first shaft 58.

A clutch control includes a motor 68 which drives a ball screw to reciprocate a drive piston 69 within chamber 70. This forces control piston 74 towards and away from clutch discs 64 and 66 to control the relative torque transmitted to shafts 58 and 60. Again, motor 68 is actuated by an electronic control in response to sensed conditions. For example, if shafts 58 and 60 are part of a vehicle drive system, the monitored conditions may be vehicle conditions including whether a wheel is slipping. The need for controlling the relative torque, and when and where it is desired to control the relative torque are also known in the prior art. The present invention allows the efficient, accurate and prompt achievement of the desired relative torque between the shafts 58 and 60. Again, motor 68 is of the sort which can be controlled rapidly, such that it can cycle on the order of 10-15 cycles per second.

A third embodiment clutch 80 includes a transfer case 81 having an input shaft 82 driving a bevel gear 84. Bevel gear 84 rotates integrally with a ring gear 86, which is fixed to drive a first shaft half 88. A plurality of planet gears 90 and planet gear carrier 92 are driven by ring gear 86. Sun gear 96 is received radially within planet gears 90, and is driven by planet gears 90. Sun gear 96 drives second axle half 94. A clutch pack 98 includes discs associated with ring gear 86 and discs associated with sun gear 96. A control piston 100 selectively forces the discs into contact to control the relative torque transmitted to first shaft 88 and second shaft 94. A fluid line 102 extends through ring gear 86 and selectively receives fluid from a chamber 108. An electronically controlled motor 104 drives a piston 106 similar to the above-described embodiments to send fluid to or from fluid line 102. A passage 110 leads to a rotary fluid fixed coupling 112 which has an annular groove 114 at a radially inner peripheral surface. A port 116 extends to a radially outer peripheral surface of ring gear 86. As ring gear 86 rotates relative to the fixed coupling 112, port 116 remains in communication with the annular groove 114, such that fluid from fluid chamber 108 can reach line 102.

When it is desired to control the relative torque between shaft halves 88 and 94, as when one might be controlling the relative drives between the front and rear axles of a vehicle, one actuates control piston 100 to control the force between the respective discs in clutch pack 98. Again, the specific times when it is desired to control the relative torques are known in the art, and form no portion of this invention.

In summary, the use of an electrically controlled rapidly actuatable motor allows one to quickly and accurately control the force on the drive pistons which in turn is related to the force between the clutch discs. This in turn allows one to accurately control the relative torque between shafts which rotate with the clutch discs.

Although three distinct transmission embodiments incorporating the inventive clutch control systems have been disclosed, it should be understood that other types of transmissions and clutches can benefit from the inventive system.

Preferred embodiments of the present invention have been disclosed. A worker of ordinary skill in the art will recognize, however, that certain modifications would come within the scope of this invention. For that reason the following claims should be studied in order to determine the true scope and content of this invention.

I claim:

1. A combination comprising:
   a first shaft having a first shaft clutch disc secured for rotation with said first shaft;
   a second shaft having a second shaft clutch disc secured for rotation with said second shaft; and
   an actuator to selectively force said first and second shaft clutch discs into contact to control the relative torque between said first and second shafts, said actuator comprising at least a first piston adjacent said first shaft clutch disc, a second piston reciprocal in a fluid chamber, a motor for reciprocating said second piston within said fluid chamber, and a fluid line connecting a face of said second piston with a face of said first piston, such that reciprocation of said second piston in said fluid chamber causes movement of said first piston towards and away from said first shaft clutch disc to control the relative torque between said first and second shafts.

2. A combination as recited in claim 1, wherein said first piston is annular.

3. A combination as recited in claim 1, wherein said motor for said second piston includes a ball screw assembly, such that the reciprocation of said second piston may be quickly and accurately controlled to achieve a desired torque between said first and second shafts.

4. A combination as recited in claim 1, wherein said motor for moving said second piston is electronically controlled.

5. A combination as recited in claim 4, wherein said first and second shafts are each portions of a vehicle drive system, and said motor for said second piston is actuated in response to sensed vehicle conditions.

6. A combination as recited in claim 1, wherein said first and second shaft clutch discs, said first and second pistons, said fluid chamber, and said fluid path all received within a casing.

7. A combination as recited in claim 6, wherein one of said first and second shafts is a drive shaft, the other of said first and second shafts being a driven shaft selectively driven by said drive shaft.

8. A combination as recited in claim 6, wherein one of said first and second shafts is connected to be driven by a sun gear, the other of said first and second shafts being connected to be driven by a ring gear, a power input being connected to drive a planet gear carrier which rotates planet gears which in turn drive said sun and ring gears, reciprocation of said second piston controlling the relative torque between said first and second shafts as they are driven.

9. A combination as recited in claim 6, wherein one of said first and second shafts connected to be driven by a ring gear, the other of said first and second shafts connected to be driven by a sun gear, a power input for selectively driving said ring gear, said ring gear connected to drive a planet gear set and carrier, said planet gear set connected to drive said sun gear to in turn drive said other shaft, reciprocation of said second piston controlling the relative torque between said first and second shafts as they are driven.

10. A vehicle drive system comprising:
    a first shaft having a first shaft clutch disc which is rotatable with said first shaft;
    a second shaft having a second shaft clutch disc which is rotatable with said second shaft; and
    an actuator for forcing said first and second shaft clutch discs towards each other to control the relative torque between said first and second shafts, said actuator comprising at least a first piston in contact with said first shaft clutch disc, a second piston received in a fluid chamber, a motor for reciprocating said second piston within said fluid chamber, and a fluid line connecting a face of said second piston with a face of said first piston, such that reciprocation of said second piston in said fluid chamber causes movement of said first piston towards and away from said first shaft clutch disc to control the relative torque between said first and second shafts.

11. A drive system as recited in claim 10, wherein said motor for said second piston includes a ball screw assembly, such that the reciprocation of said second piston may be quickly and accurately controlled to achieve a desired torque between said first and second shafts.

12. A drive system as recited in claim 10, wherein said first and second shaft, said first and second shaft clutch discs, said first and second pistons, said fluid chamber and said fluid path all received within a casing.

13. A drive system as recited in claim 10, wherein one of said first and second shafts is a drive shaft, the other of said first and second shafts being a driven shaft selectively driven by said drive shaft.

14. A drive system as recited in claim 10, wherein one of said first and second shafts is connected to be driven by a sun gear, the other of said first and second shafts being connected to be driven by a ring gear, a power input being connected to drive a planet gear carrier which rotates planet gears which in turn drive said sun and ring gears, reciprocation of said second piston controlling the relative torque between said first and second shafts as they are driven by said planet gears.

15. A drive system as recited in claim 10, wherein one of said first and second shafts connected to be driven by a ring gear, the other of said first and second shafts connected to be driven by a sun gear, a power input for selectively driving said ring gear, said ring gear connected to drive a planet gear set and carrier, said planet gear set connected to drive said sun gear to in turn drive said other shaft, reciprocation of said second piston controlling the relative torque between said first and second shafts as they are driven by said planet gears.

16. A drive system as recited in claim 15, wherein a fluid path extends from said fluid chamber to a rotary coupling fixed in a casing, said rotary coupling having an annular groove at an inner peripheral surface, said ring gear rotating within said rotary coupling and having a port communicating with said annular groove such that fluid from said fluid chamber may move through said annular groove into said port in said ring gear and communicate with a chamber adjacent said drive piston to actuate said drive piston.

17. A drive system as recited in claim 10, wherein said motor for said second piston is actuated in response to sensed vehicle drive conditions.

18. A clutch control system comprising:
a first piston for selective engagement with a clutch disc;
a second piston received in a fluid chamber, a motor for reciprocating said second piston within said fluid chamber, said motor comprising a ball screw arrangement such that the reciprocation of said second piston in said chamber may be quickly and accurately controlled; and
a fluid path connecting said fluid chamber and said first piston, said fluid chamber and said fluid path adapted to receive a fluid such that reciprocation of said second piston in said second chamber causes corresponding reciprocation of said first piston.

19. A clutch control system as recited in claim 18, wherein said motor is actuated in response to sensed conditions of a vehicle.

20. A clutch control system as recited in claim 18, wherein said first and second pistons, said fluid chamber, and said fluid path are all received within a casing for a clutch which is to be actuated by said control system.

* * * * *